United States Patent
Walls et al.

(10) Patent No.: US 6,727,904 B2
(45) Date of Patent: Apr. 27, 2004

(54) SYSTEM AND METHOD FOR RENDERING GRAPHICAL DATA

(75) Inventors: Jeffrey J. Walls, Fort Collins, CO (US); Don B. Hoffman, Fort Collins, CO (US); Per E Gullberg, Fort Collins, CO (US); Kevin T. Lefebvre, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 173 days.

(21) Appl. No.: 10/087,151

(22) Filed: Mar. 1, 2002

(65) Prior Publication Data

US 2003/0164833 A1 Sep. 4, 2003

(51) Int. Cl.[7] .................................................. G06T 1/20
(52) U.S. Cl. ........................ 345/506; 345/504; 345/629
(58) Field of Search ................................. 345/506, 504, 345/505, 502, 501, 536, 545, 629, 556, 634

(56) References Cited

U.S. PATENT DOCUMENTS

| | | | | |
|---|---|---|---|---|
| 5,321,808 A | | 6/1994 | Rupp | 395/164 |
| 5,392,394 A | * | 2/1995 | Hamana | 345/504 |
| 5,408,602 A | | 4/1995 | Giokas | 395/157 |
| 5,408,606 A | * | 4/1995 | Eckart | 345/505 |
| 5,572,657 A | * | 11/1996 | Pinedo et al. | 345/506 |
| 5,757,321 A | | 5/1998 | Billyard | 345/434 |
| 5,844,553 A | | 12/1998 | Hao et al. | 345/329 |
| 5,847,711 A | * | 12/1998 | Kaufman et al. | 345/424 |
| 5,963,200 A | * | 10/1999 | Deering et al. | 345/504 |
| 6,005,572 A | | 12/1999 | Kurihara | 345/340 |
| 6,046,709 A | * | 4/2000 | Shelton et al. | 345/504 |
| 6,118,452 A | * | 9/2000 | Gannett | 345/418 |
| 6,157,395 A | * | 12/2000 | Alcorn | 345/506 |
| 6,215,486 B1 | | 4/2001 | Walls et al. | 345/329 |
| 6,222,550 B1 | | 4/2001 | Rosman et al. | 345/419 |
| 6,249,294 B1 | | 6/2001 | Lefebvre et al. | 345/504 |
| 6,343,309 B1 | * | 1/2002 | Clarke et al. | 345/418 |
| 6,515,670 B1 | * | 2/2003 | Huang et al. | 345/503 |
| 2002/0085010 A1 | * | 7/2002 | McCormack et al. | 345/545 |

OTHER PUBLICATIONS

Computer Graphics, "PixelFlow: High Speed Rendering Using Image Composition" by Molnar et al, Siggraph'92, Jul. 26–31, 1992, pp. 231–240.*

1997 Siggraph/Eurographics Workshop, "PixelFlow: The Realization", Eyles et al, Aug. 3–4, 1997, pp. 57–68.*

Microprocessor Report, "Talisman redefines 3D rendering; new Microsoft architecture trades precision for speed", Peter Glaskowsky, v10, n11, p8(3)., Aug. 26, 1996.*

"Understanding X Features: Distributed Single Logical Screen" http://www.hp.com/xwindow/sharedInfo/Whitepapers/Slsd/slsd.html, 1998, pp. 1–10.

Lefebvre, Kevin "Hewlett–Packard's Large Screen Multi–Display Technology: An Exploration of the Architecture Behind HP's New Immersive Visualization Solutions" http://www .hp.com;xwindow/sharedInfo/Whitepapers/Sls3d/sls__3d.html; 1998, pp. 1–9.

"Understanding X Features: Multiple Display Technologies" http://www.hp.com/xwindow/sharedInfo/Whitepapers/Sls/sls.html, 1997, pp. 1–13.

* cited by examiner

Primary Examiner—Kee M. Tung

(57) ABSTRACT

A system rendering graphical data from a graphics application utilizes a plurality of frame buffers, a plurality of graphics pipelines, and logic. Each of the graphics pipelines is configured to render graphical data to a different one of the frame buffers. The logic is configured to determine a mode of operation of the graphics application and to prevent, based on the mode of operation of the graphics application, at least one of the graphics pipelines from rendering the graphical data from the graphics application.

20 Claims, 7 Drawing Sheets

SYSTEM AND METHOD FOR RENDERING GRAPHICAL DATA

BACKGROUND OF THE INVENTION

1. Field of the Invention

The present invention generally relates to graphical display systems and, in particular, to a system and method for rendering graphical data.

2. Related Art

Graphical display systems are commonly used for displaying graphical representations of two-dimensional and/or three-dimensional objects on a two-dimensional display device, such as a cathode ray tube, for example. In this regard, a graphical display system normally includes one or more graphics applications having graphical data that defines one or more graphical objects. When a graphical object is to be displayed, the graphics application submits a command or a set of commands, referred to here after as a "drawing command," for drawing the object. The drawing command includes or is associated with graphical data that defines the color value and possibly other attributes for each pixel of the object.

In response to the drawing command, a graphical pipeline within the graphical display system renders the command's graphical data to a frame buffer. The data within the frame buffer defines the display attributes (e.g., color) for each pixel of a display device, which periodically reads the frame buffer and colors each pixel displayed by the display device according to each pixel's corresponding color value in the frame buffer. Moreover, by rendering the graphical data of the drawing command to the frame buffer, the image displayed by the output device is eventually updated to include an image of the object defined by the graphical data of the drawing command.

To provide more detailed and/or higher quality images, it may be desirable to add objects to the scenes defined by the graphics applications and/or to increase the amount of graphical data utilized to define the objects of the graphics applications. However, increasing the graphical data of a graphics application can adversely affect the running performance of the application. To help reduce the impact of such adverse effects, it is generally desirable to run the graphics applications on graphical display systems that exhibit higher rendering speeds.

Unfortunately, graphical display systems capable of rendering graphical data at higher speeds are typically more complex and more expensive than graphical display systems that render at slower speeds. Thus, a trade-off between cost and performance (e.g., rendering speed) often exists in selecting a graphical display system for running a particular application.

Furthermore, the running performance of a graphics application can be affected by factors other than the rendering performance of the graphical display system. For example, the application's mode of operation can have a significant bearing on the application's running performance.

In this regard, graphics applications generally operate in one of two possible modes of operation: display list mode and immediate mode. In display list mode, the graphical data of each object rendered by a pipeline of a graphical display system is saved within the pipeline's memory, and each saved object is contained within a display list. To render a graphical object contained in a pipeline's display list, the graphics application passes, to the pipeline, a command that identifies the display list instead of a command that includes the graphical data defining the object. In response to this command, the pipeline retrieves the object's graphical data from the pipeline's memory and renders the retrieved graphical data.

It generally takes less time for the pipeline to retrieve and render graphical data from its own memory than it takes for the same graphical data to be transmitted to the pipeline from the graphics application and rendered by the pipeline. Thus, as the graphical data of more objects is stored in the pipeline's memory, the efficiency of the pipeline generally improves, thereby improving the running performance of the graphics application.

However, some graphics applications operate in the immediate mode rather than the display list mode. In the immediate mode, the graphics application provides the pipeline with an object's graphical data each time the object is to be rendered regardless of whether or not the object has been previously rendered by the pipeline. Thus, less efficiency gains from reexecuting the same graphics commands are generally realized for graphics applications operating in the immediate mode.

SUMMARY OF THE INVENTION

The present invention generally pertains to a system and method for rendering graphical data from a graphics application.

A system in accordance with one embodiment of the present invention utilizes a plurality of frame buffers, a plurality of graphics pipelines, and logic. Each of the graphics pipelines is configured to render graphical data to a different one of the frame buffers. The logic is configured to determine a mode of operation of the graphics application and to prevent, based on the mode of operation of the graphics application, at least one of the graphics pipelines from rendering the graphical data from the graphics application.

The present invention can also be viewed as providing a method for rendering graphical data from graphics applications. The method can be broadly conceptualized by the following steps: receiving a graphics command from a graphics application; rendering, via a first graphics pipeline, graphical data from the graphics command to one of a plurality of frame buffers; identifying a mode of operation of the graphics application; causing the graphics command to bypass a second graphics pipeline based on the identifying step.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION OF THE INVENTION

Figure 1:
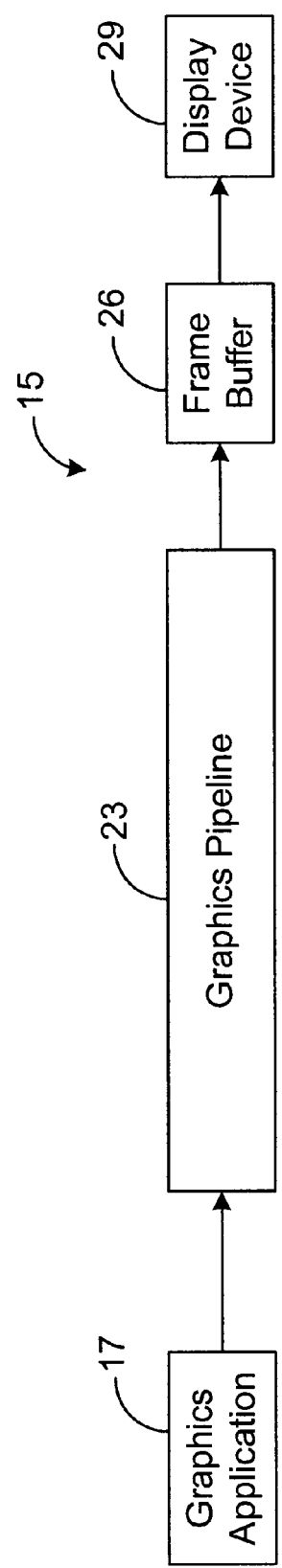
FIG. 1 is a block diagram illustrating a conventional graphical display system.

FIG. 1 depicts an exemplary embodiment of a conventional graphical display system 15. A graphics application 17 defines, in data, various objects that may be rendered and displayed by the system 15. To display an object, the application 17 transmits a graphics command having graphical data that defines the object to a graphics pipeline 23, which may be implemented in hardware, software, or a combination thereof. The graphics pipeline 23 receives the graphical data from the application 17, through well-known techniques, renders the graphical data to a frame buffer 26.

In general, the frame buffer 26 stores graphical data defining an image that is to be displayed by a display device 29. In this regard, the frame buffer 26 includes a set of data for each pixel displayed by the display device 29. Each set of data is correlated with the coordinate values that identify one of the pixels displayed by the display device 29, and each set of data includes the color value of the identified pixel, as well as any additional information needed to appropriately color or shade the identified pixel.

Figure 2:
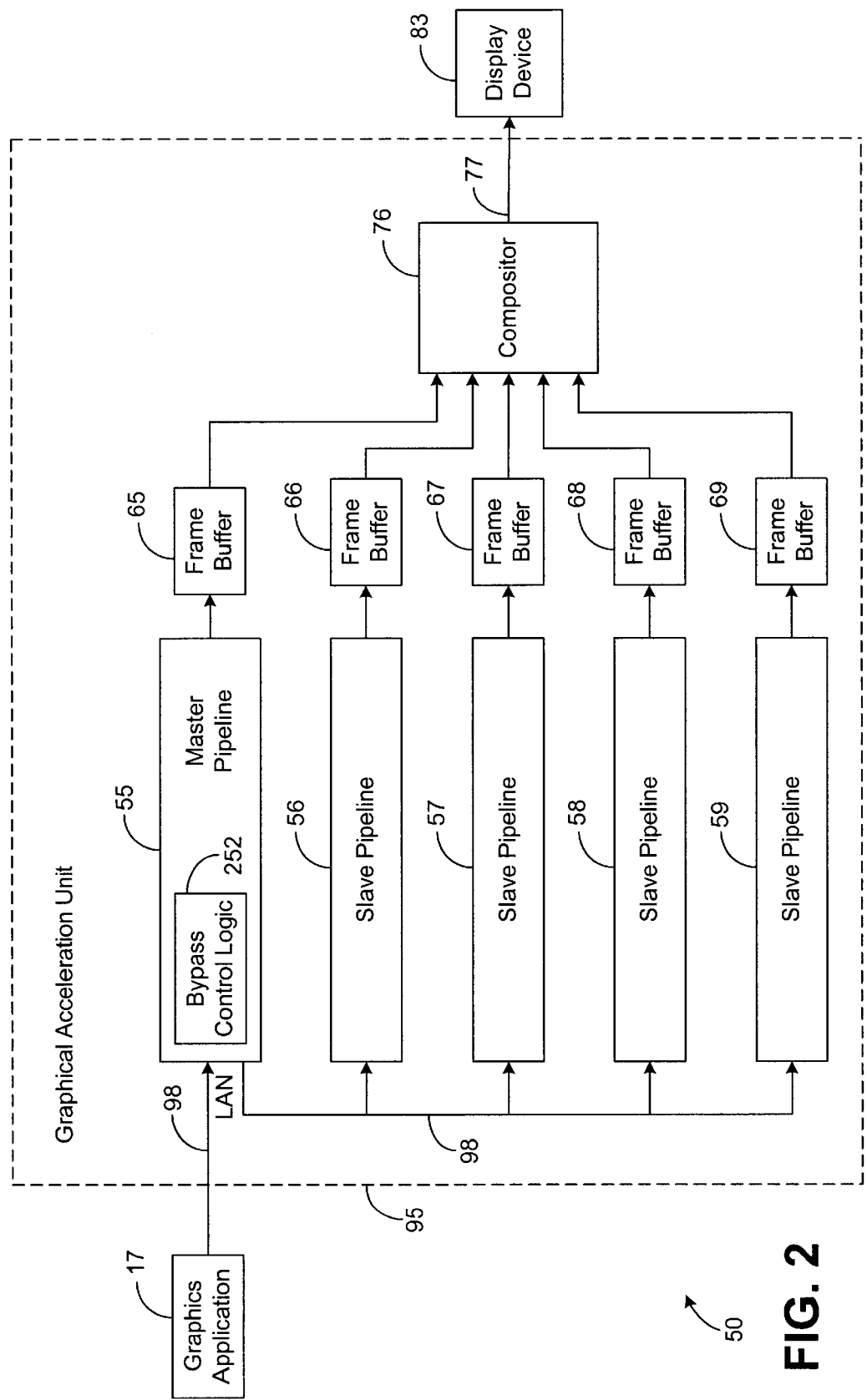
FIG. 2 is a block diagram illustrating a graphical display system in accordance with an exemplary embodiment of the present invention.

By employing a plurality of graphics pipelines, it is possible to increase rendering speed and/or image quality. For example, FIG. 2 depicts an exemplary embodiment of a graphical display system 50 having multiple pipelines 55–59. As shown by FIG. 2, the system 50 includes a graphics application 17, a master graphics pipeline 55, and one or more slave graphics pipelines 56–59. The pipelines 55–59 via hardware, software or any combination thereof. It should be noted that the embodiment shown by FIG. 2 depicts four slave pipelines 56–59 for illustrative purposes only, and any number of slave pipelines 56–59 may be employed to implement the system 50 in other embodiments.

The master pipeline 55 receives graphics commands from the application 17. The master pipeline 55 preferably renders the graphical data from two-dimensional (2D) graphics commands to the frame buffer 65 and passes three-dimensional (3D) graphics commands to the slave pipelines 56–59, which render the graphical data of the 3D graphics commands to the frame buffers 66–69, respectively. As used herein, a "2D graphics command" refers to a graphics command that includes 2D graphical data but no 3D graphical data, and a "3D graphics command" refers to a graphics command that includes 3D graphical data. Note that a 3D graphics command may also include 2D graphical data.

Also note that other arrangements of the pipelines 55–59 are possible in other embodiments. More specifically, the master pipeline 55 may be configured to render graphical data from 3D graphics commands in addition to or in lieu of graphical data from 2D graphics commands, and one or more of the slave pipelines 56–59 may be configured to render graphical data from 2D graphics commands instead of or in addition to graphical data from 3D graphics commands.

Each frame buffer 65–69 outputs a stream of graphical data to a compositor 76, which may be implemented in software, hardware, or a combination thereof. The compositor 76 is configured to combine each of the data streams from the frame buffers 65–69 into a composite data signal 77 that is provided to the display device 83, which may be a monitor (e.g., cathode ray tube) or other device for displaying an image. The graphical data provided to the display device 83 by the compositor 76 defines the image to be displayed by the display device 83 and is based on the graphical data rendered by the pipelines 55–59 to the frame buffers 65–69. The compositor 76 will be further described in more detail hereafter. Note that each data stream depicted in FIG. 2 may be either a serial data stream or a parallel data stream. Also note that the pipelines 55–59, the frame buffers 65–69, and the compositor 76 will be collectively referred to herein as a graphical acceleration unit 95.

In some situations, it may be desirable to distribute some of the graphics pipelines 55–59 across multiple computers. In this regard, by distributing the graphics pipelines 55–59 across multiple computers, it is possible to divide the processing burden associated with the rendering performed by the pipelines 55–59 across the multiple computers rather than having a single computer bear the entire processing burden alone. For illustrative purposes, assume that, in the embodiment shown by FIG. 2, each of the graphics pipelines 55–59 is implemented via a different computer. However, it should be noted that, in other embodiments, multiple ones of the graphics pipelines 55–59 could be implemented via the same computer, if desired. As used herein, the term "computer" refers to a set of resources that accept, process, and output data according to prescribed rules and that are managed by the same kernel. Note that multiple computers may be physically attached to one another (e.g., located on the same printed circuit board (PCB) or within the same PCB rack).

When the graphics pipelines 55–59 are implemented via different computers, it may be desirable to utilize a network, such as a local area network (LAN), for example, to enable communication between the pipelines 55–59. Indeed, in the exemplary embodiment shown by FIG. 2, a LAN 98 is utilized to interconnect each of the pipelines 55–59, which preferably reside on different computers as described above.

Figure 3:
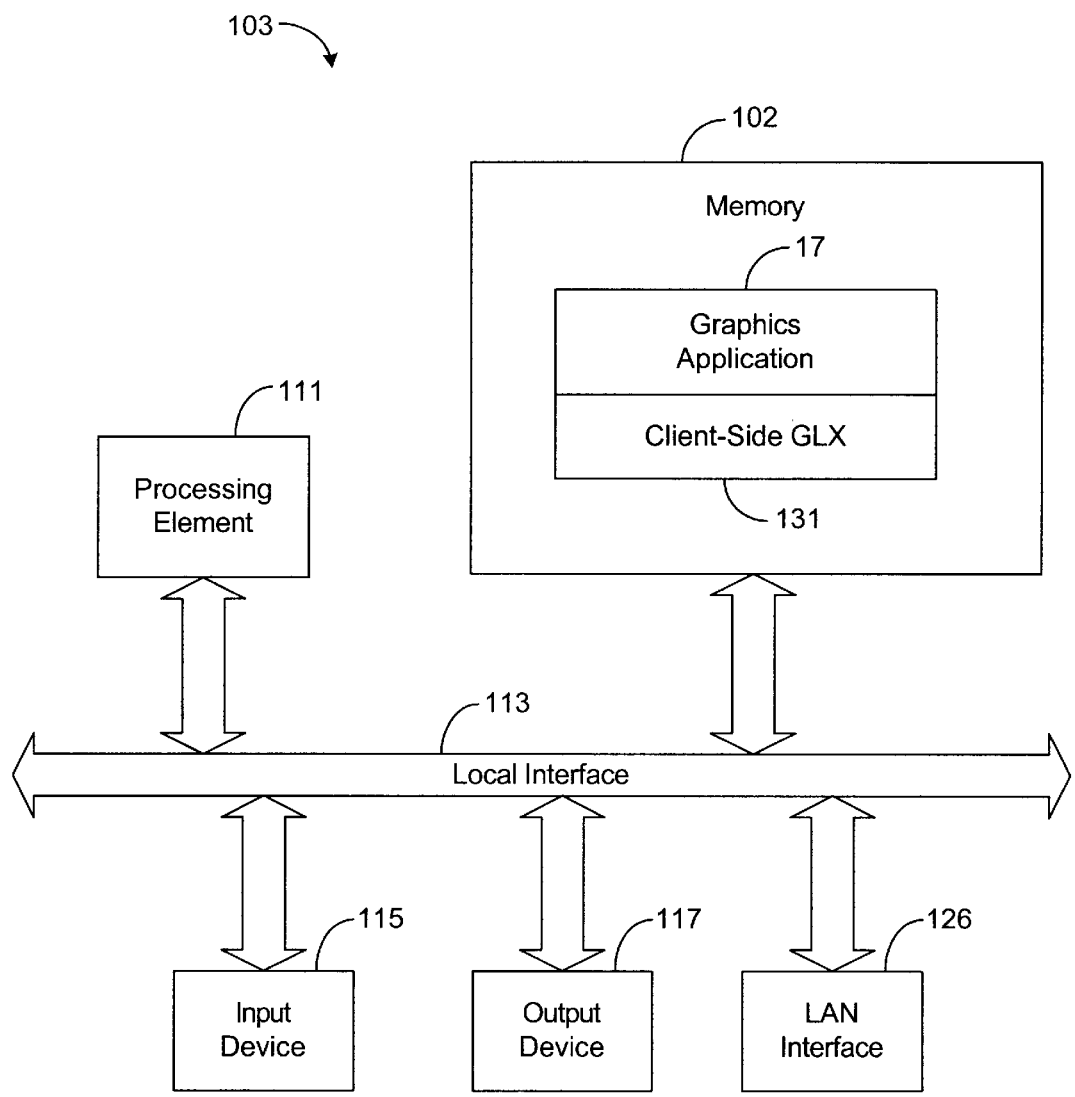
FIG. 3 is a block diagram illustrating a computer for running a graphics application such as is depicted in FIG. 2.

FIG. 3 depicts a block diagram of a computer 103, referred to hereafter as "client computer," that may be utilized to run the graphics application 17 in the preferred embodiment. As can be seen by referring to FIG. 3, the client computer 103 preferably stores the graphics application 17 in memory 102. Through conventional techniques, the application 17 is executed via one or more conventional processing elements 111, such as a central processing unit (CPU), for example, which communicates to and drives the other elements within the cleint computer 103 via a local interface 113, which can include one or more buses. Furthermore, an input device 115, for example, a keyboard or a mouse, can be used to input data from a user of the client computer 103, and an output device 117, for example, a display device or a printer, can be used to output data to the user. The client computer 103 is preferably includes to a LAN interface 126 that allows the client 52 to exchange data with the LAN 98.

Various types of network protocols may be employed to process the graphical data received from the graphics application 17. In the exemplary embodiment of the system 50 described herein, X Protocol is preferably utilized to render 2D graphical data, and an extension of X Protocol, referred to as "OpenGL (OGL) Protocol," is preferably utilized to render 3D graphical data, although other types of protocols may be utilized in other embodiments.

By way of background, OGL Protocol is a standard application programming interface (API) to hardware that accelerates 3D graphics operations. Although OGL Protocol is designed to be window system independent, it is often used with window systems, such as the X Window System, for example. In order that OGL Protocol may be used in an X Window System environment, an extension of the X Window System has been developed called "GLX." For more complete information on the GLX extension to the X Window System and on how OGL Protocol can be integrated with the X Window System, see for example Mark J. Kilgard, *OpenGL Programming for the X Window System* (Addison-Wesley Developers Press 1996), which is incorporated herein by reference. Also see commonly-assigned U.S. Pat. No. 6,349,294, entitled "3D Graphics in a Single Logical Screen Display Using Multiple Remote Computer Systems," which is incorporated herein by reference as well.

The client computer 103 preferably includes a client-side GLX layer 131 that can be implemented in software, hardware, or a combination thereof. In the embodiment shown by FIG. 3, the client-side GLX layer 131 is implemented in software and translates each command issued by the graphics application 17 into one or more X Protocol commands, for performing the functionality commanded by the issued command. In the preferred embodiment, the X Protocol commands are communicated to master pipeline 55 via LAN interface 126 and LAN 98.

Figure 4:
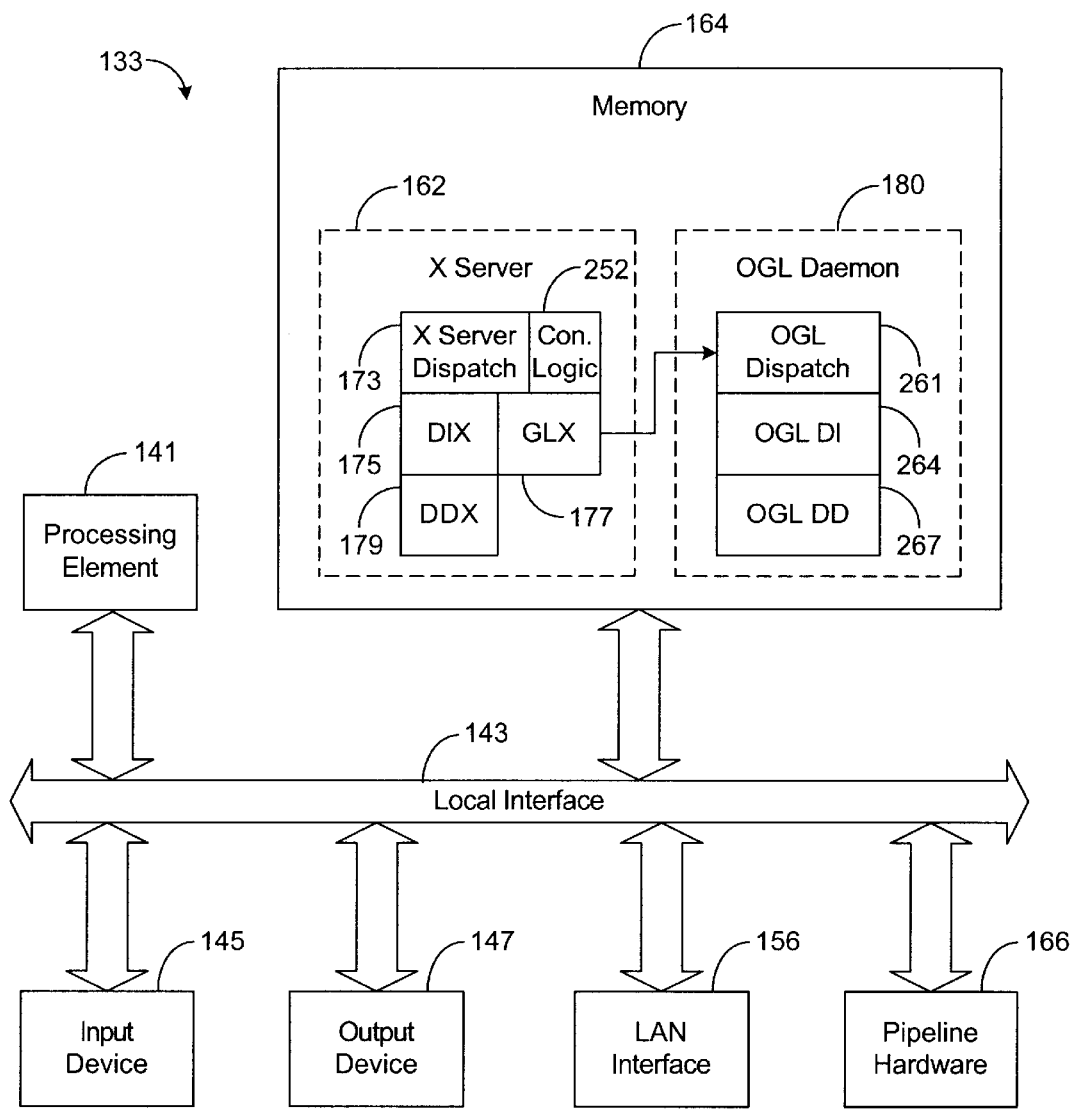
FIG. 4 is a block diagram illustrating a computer for implementing a master pipeline such as is depicted in FIG. 2.

FIG. 4 depicts a block diagram of a computer 133 that may be utilized to implement the master pipeline 55 in the preferred embodiment. As shown by FIG. 4, the computer 133 preferably includes one or more processing elements 141, such as a central processing unit, for example, that communicate to and drive the other elements within the computer 133 via a local interface 143, which can include one or more buses. Furthermore, an input device 145, for example, a keyboard or a mouse, can be used to input data from a user of the computer 133, and an output device 147, for example, a display device or a printer, can be used to output data to the user. The computer 133 may be connected to a LAN interface 156 that allows the computer 133 to exchange data with the LAN 62.

The computer 133 of the preferred embodiment also includes an X server 162. The X server 162 may be implemented in software, hardware, or a combination thereof, and in the embodiment shown by FIG. 5, the X server 162 is implemented in software and stored in memory 164. In the preferred embodiment, the X server 162 renders 2D X Protocol commands, such as commands to create or move an X window. In this regard, an X server dispatch layer 173 is designed to route received commands to a device independent (DIX) layer 175 or to a GLX layer 177. A 2D X Protocol command (i.e., an X Protocol command that does not include 3D graphical data) is interfaced with the DIX layer 175, whereas a 3D X Protocol command (i.e., an X Protocol command that does include 3D graphical data, such as an X Protocol command having embedded OGL Protocol) is routed to the GLX layer 177. An example of a 3D X Protocol command is an X Protocol command that creates or changes the state of a 3D image within a 2D X window.

Moreover, a command interfaced with the DIX layer 175 is executed by the DIX layer 175 and by a device dependent (DDX) layer 179, which drives graphical data associated with the executed command through pipeline hardware 166 to the frame buffer 65. A command interfaced with the GLX layer 177 is transmitted by the GLX layer 177 across the LAN 98 to the slave pipelines 56–59, when the graphics application 17 is operating in the display list mode, as will be described in more detail hereafter. After receiving the command, one or more of the pipelines 56–59 executes the command and renders the graphical data associated with the command to one or more frame buffers 66–69. Note that logic for implementing the master pipeline 55 shown by FIG. 2 generally resides within the X server 162, the pipeline hardware 166, and the OGL Daemon 180, which will be described in more detail hereafter.

Although the graphics application 17 and the master pipeline 55 are implemented via different computers 103 and 133 in the preferred embodiment, it is possible for the graphics application 17 and the master pipeline 55 to be implemented via the same computer in other embodiments. For example, it is possible to store the graphics application 17 and the client-side GLX layer 131 in the memory 164 of the computer 133 shown by FIG. 4.

Figure 5:
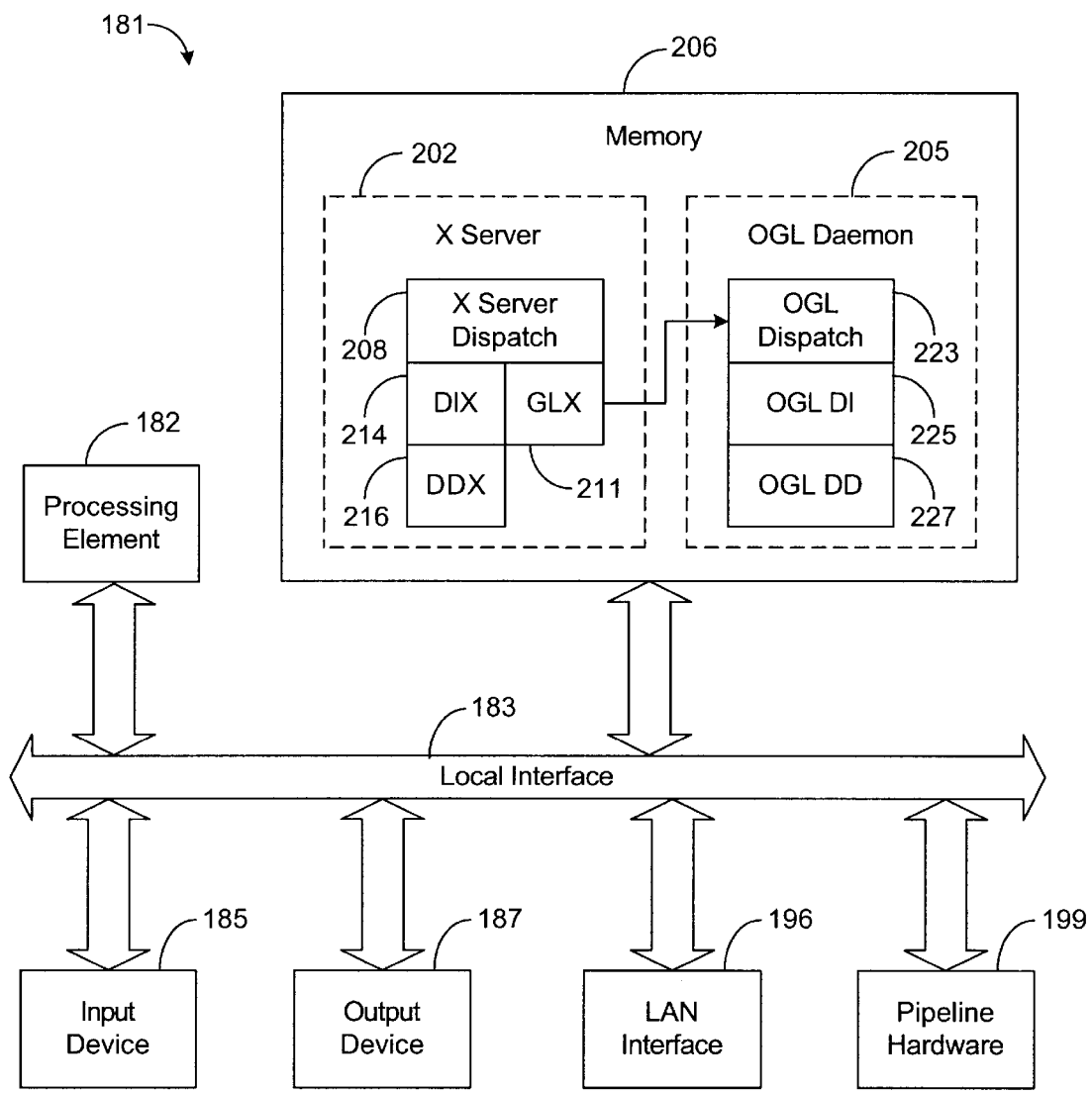
FIG. 5 is a block diagram illustrating a computer for implementing a slave pipeline such as is depicted in FIG. 2.

FIG. 5 depicts a block diagram of a computer 181 that may be utilized to implement any one of the slave pipelines 56–59. The computer 181, shown by FIG. 5, preferably includes an X server 202, similar to the X server 162 previously described for computer 133, and an OGL daemon 205. The X server 202 and OGL daemon 205 may be implemented in software, hardware, or a combination thereof, and in the embodiment shown by FIG. 5, the X server 202 and OGL daemon 205 are implemented in software and stored in memory 206.

Similar to computers 103 and 133 (FIGS. 3 and 4), the computer 181 of FIG. 5 includes one or more processing elements 182 that communicate to and drive the other elements within the computer 181 via a local interface 183, which can include one or more buses. Furthermore, an input device 185, for example, a keyboard or a mouse, can be used to input data from a user of the computer 181, and an output device 187, for example, a display device or a printer, can be used to output data to the user. The computer 181 preferably includes a LAN interface 196 that allows the computer 181 to exchange data with the LAN 98.

Similar to X server 162 (FIG. 4), the X server 202 of FIG. 5 comprises an X server dispatch layer 208, a GLX layer 211, a DIX layer 214, and a DDX layer 216. In the preferred embodiment, each command received by the computer 181 includes 3D graphical data, because the X server 162 of master pipeline 55 preferably executes each 2D X Protocol command. The X server dispatch layer 208 interfaces the 2D data of any received commands with DIX layer 214 and interfaces the 3D data of any received commands with the GLX layer 211. The DIX and DDX layers 214 and 216 are configured to process or accelerate the 2D data and to drive the 2D data through pipeline hardware 199 to one of the frame buffers 66–69 (FIG. 2).

The GLX layer 211 interfaces the 3D data with the OGL dispatch layer 223 of the OGL daemon 205. The OGL dispatch layer 223 interfaces this data with the OGL DI layer 225. The OGL DI layer 225 and DD layer 227 are configured to process the 3D data and to accelerate or drive the 3D data through pipeline hardware 199 to one of the frame buffers 66–69 (FIG. 3). Thus, the 2D graphical data of a received command is processed or accelerated by the X server 202, and the 3D graphical data of the received command is processed or accelerated by the OGL daemon 205. Note that logic for implementing a slave pipeline 56–59 (FIG. 2) generally resides within the X server 202, pipeline hardware 199, and OGL Daemon 205.

As set forth above, the compositor 76 (FIG. 2) is configured to form a composite signal 77 that is based on the graphical data stored in the frame buffers 65–69. The composite signal 77 defines the color values for the pixels of the display device 83, and the display device 83 updates its displayed image based on the color values received from the composite signal 77. Exemplary techniques that may be utilized by the compositor 76 to process the graphical data from the frame buffers 65–69 and to form the composite signal 77 will now be generally described in more detail hereafter.

In this regard, the compositor 76 preferably processes the graphical data from the frame buffers 65–69 differently depending on the type of rendering that is desired. For example, in some situations, it may be desirable to utilize the additional processing power provided by the slave pipelines 56–59 in an effort to increase the overall rendering speed of the system 50. In such situations, each of the slave pipelines 56–59 may be configured to only render a different portion of a 3D image to be displayed by the display device 83. In essence, each slave pipeline 56–59 is responsible for only rendering graphical data that defines a particular area of the 3D image and discards any graphical data that defines an area outside of the pipeline's particular area of responsibility.

The compositor 76 then inserts, into the composite signal 77, color values from each of the frame buffers 65–69 depending on the areas of responsibility for the pipelines 55–59. In this regard, the compositor 76 inserts, into the composite signal 77, a color value from a particular frame buffer 65–69 only if the color value is within the area of responsibility for the particular buffer's corresponding pipeline 55–59. In this example, each pipeline 55–59 renders, to its respective frame buffer 65–69 only a portion of the overall graphical data defining the image displayed by the display device 83, potentially increasing the overall rendering speed of the system 50.

In other situations, it may be desirable to utilize the additional processing power provided by the slave pipelines 56–69 in an effort to increase image quality. There are several ways that this may be accomplished. For example, each of the slave pipelines 56–59 may be configured to render only a portion of the 3D image to be displayed by the display device 83, as described above. However, before rendering to the frame buffers 66–69, the slave pipelines 56–69 super-sample the graphical data rendered by the slave pipelines 56–59. In other words, each of the slave pipelines 56–59 magnifies the image being rendered by the pipeline 56–59. For each of the frame buffers 66–69, the compositor 76 blends the graphical data within the frame buffer 66–69 such that the image defined by such data is reduced to its original size (i.e., the mage's size before super-sampling).

The compositor 76 then inserts, into the composite signal 77, the blended color alues depending on the areas of responsibility for the pipelines 55–59. In this regard, the compositor 76 inserts, into the composite signal 77, the blended color values derived from each of the frame buffers 66–69 just as the compositor 76 inserted the graphical data from each of the frame buffers 66–69 in the example previously described above. By super-sampling and then blending the graphical data rendered by each of the slave pipelines 56–69, the image displayed by the display device 83 is antialiased.

In another example, the quality of the image displayed by the display device 83 may be increased via jitter enhancement. In this regard, each of the slaves pipelines 56–59 renders, to the frame buffers 66–69, the entire 3D image to be displayed by the display device 83. However, in rendering the graphical data, each of the slave pipelines 56–59 adds a small offset to the coordinates of each pixel rendered by the pipeline 56–59. The offset applied to the pixel coordinates is preferably different for each different pipeline 56–59.

The compositor 76 averages the color values for the same pixel coordinates from frame buffers 66–69 to define the pixel color values that are provided to the display device 83 via the composite signal 281. The display device 83 then displays the averaged color values, thereby displaying a jitter enhanced image.

Note that the aforedescribed techniques for utilizing the additional slave pipelines 56–59 in an effort to enhance rendering speed and/or image quality are described in more detail in commonly-assigned U.S. patent application Ser. No. 09/715,335, entitled "System and Method for Efficiently Rendering Graphical Data," which is incorporated herein by reference. In addition, other techniques may be employed to exploit the additional processing power provided by the slave pipelines 56–69 for the purposes of enhancing rendering speed and/or image quality.

Although the system 50 described above can enhance rendering speed and/or image quality in various situations, a potential drawback associated with using the system 50 pertains to additional buffering and communication of graphical data performed by master pipeline 55. In this regard, according to the techniques described above, the master pipeline 55 receives a 3D graphics command from the graphics application 17 and provides the 3D graphics command to each of the slave pipelines 56–59. Moreover, the master pipeline 55 may buffer each 3D graphics command or, in other words, temporarily store each 3D graphics command in the master pipeline's memory 164 (FIG. 4) in order to enable the master pipeline 55 to pass copies of the 3D graphics command to each of the slave pipelines 56–59. The buffering and subsequent communication of 3D graphics commands to the slave pipeline's 56–59 external to the master pipeline's computer 133 can cause significant delays depending on the mode of the graphics application 17 that is providing the graphics command.

In this regard, the aforedescribed buffering and communication of 3D graphics commands usually does not cause significant delays when the graphics application 17 is operating in the display list mode. Indeed, when the graphics application 17 is running in the display list mode, the pipelines 55–59 store the graphical data of each object rendered by the pipelines 55–59. Therefore, as more objects are rendered, the amount of graphical data included in the graphics commands received from the graphics application 17 generally reduces. As a result, rendering delays caused by the master pipeline 55 buffering 3D graphics commands and communicating the 3D graphics commands to the slave pipelines 56–59 are, in most cases insignificant, when the graphics application 17 is running in the display list mode. Moreover, any such rendering delays are usually more than offset by the rendering speed and/or image quality enhancements enabled by utilizing multiple pipelines 55–59 to render the graphical data received from the application 17.

However, when the application 17 is operating in the immediate mode, the amount of graphical data transmitted from the application 17 can be significant even after execution of many of the graphics commands in the application 17. Thus, rendering delays caused by the master pipeline 55 buffering 3D graphics commands and communicating the 3D graphics commands to the slave pipeline's 56–59 can significantly delay the rendering speed of the system 50. Indeed, in many instances, such rendering delays cause the rendering speed of the system 50 to fall significantly below the rendering speed of various conventional graphical display systems, such as the system is shown in FIG. 1.

In an effort to optimize the performance of the system 50, the system 50 preferably includes bypass control logic 252 (FIG. 2), which can be implemented in software, hardware, or a combination thereof. In the preferred embodiment, as illustrated by way of example in FIG. 2, the bypass control logic 252, along with its associated methodology, is implemented in the master pipeline 55, although the bypass control logic 252 may reside in other locations in other embodiments.

The bypass control logic 252 is preferably configured to control the operation of the system 50 such that the graphics commands processed by the master pipeline 55 bypass the slave pipelines 56–59 external to the master pipeline's computer 133 at selected times, such as when the graphics application 17 is operating in the immediate mode. In this regard, when the graphics application 17 is operating in the display list mode, delays caused by the master pipeline 55 buffering the 3D graphics commands in its memory 164 and communicating the buffered 3D commands to the slave pipelines 56–59 are likely to be insignificant. Therefore, the bypass control logic 252 preferably allows the master pipeline 55 to buffer the 3D graphics commands in the memory 164 and then to provide each of the buffered 3D commands to the slave pipelines 56–59 such that the system 50 can operate as previously described above.

However, when the graphics application 17 is operating in the immediate mode, delays caused by the master pipeline 55 buffering the 3D graphics commands in its memory 164 and communicating the buffered 3D commands to the slave pipelines 56–59 are likely to be significant. Therefore, the bypass control logic 252 preferably disables the foregoing buffering and communication by the master pipeline 55, thereby effectively causing the graphics commands to bypass the slave pipelines 56–59.

More specifically, the bypass control logic 252 preferably controls the master pipeline 55 such that the graphical data of any graphics command executed by the master pipeline 55 is rendered to the frame buffer 65 by the master pipeline 55. Furthermore, the bypass control logic 252 also controls the master pipeline 55 such that any graphics command, including the graphical data associated with the command, executed by the master pipeline 55 is not buffered in the master pipeline's memory 164 and then communicated to the slave pipelines 56–59. Operating the master pipeline 55 in this way eliminates the delays caused by the master pipeline 55 buffering graphics commands and communicating the buffered commands to the slave pipelines 56–59. Moreover, bypassing the slave pipelines 56–59 external to the master pipeline's computer 133, when the graphics application 17 is operating in the immediate mode, can significantly increase the performance of the system 50.

When the slave pipelines 56–59 external to the master pipeline's computer 133 are being bypassed, the master pipeline's computer 133 preferably renders all of the graphical data included in the commands issued by the graphics application 17. Thus, the master pipeline 55 may include logic, such as the OGL daemon 180 (FIG. 4), for rendering 3D graphical data. Any 3D graphical data of a command executed by the master pipeline 55 is preferably rendered to the frame buffer 65 by the OGL daemon 180. Note that the OGL daemon 180 may be configured similar to or identical to the OGL daemon 205 shown in FIG. 5 and, therefore, may include an OGL dispatch layer 261, an OGL device independent (DI) layer 264, and an OGL device dependent (DD) layer 167 similar to the layers 223, 225, and 227 of FIG. 5. Therefore, when the graphics application 17 is operating in the immediate mode, the X server 202 preferably renders any 2D graphical data received from the graphics application 17, and the OGL daemon 180 preferably renders any 3D graphical data received from the graphics application 17.

In some embodiments, it is possible for one or more of the slave pipelines 56–59 to be implemented via the same computer 133 as the master pipeline 55. In such an embodiment, the slave pipelines 56–59 implemented via the master pipeline's computer 133 can share the same hardware and memory resources utilized to implement the master pipeline 55. Therefore, the foregoing slave pipelines 56–59 can be provided with the graphics commands received or processed by the master pipeline's computer 133 without adding significant delay to the overall rendering performed by the system 50.

Accordingly, in such an embodiment, it may be desirable to enable the slave pipelines 56–59 that are implemented via the master pipeline's computer 133 to render graphical data. Allowing such pipelines to render graphical data enables the system 50 to render the graphical data from the application 17 via multiple pipelines, thereby enabling some of the rendering speed and/or image quality enhancements previously described above. Moreover, in such an embodiment, the bypass control logic 252 preferably controls the system 50 such that only the slave pipelines 56–59 external to the master pipelines computer 133 are bypassed by the graphics commands issued by the application 17 when the application 17 is operating in the immediate mode.

There are a variety of methodologies that may be employed by the bypass control logic 252 for controlling the bypassing of the slave pipelines 56–59 external to the master pipeline's computer 133. For example, the bypass control logic 252 may be included in and implemented via the X server 162, as shown by FIG. 4. In this regard, when the graphics application 17 is operating in the display list mode, the control logic 252 can be configured to cause the X server 162 to route 3D graphics commands to each of the slave pipelines 56–59 and to route 2D graphics commands to the DIX and DDX layers 175 and 179. As a result, in the preferred embodiment, the slave pipelines 56–59 render the graphical data of 3D graphics commands to the frame buffers 56–59 according to techniques previously described herein, and the DIX and DDX layers 175 and 179 of the master pipeline 55 render the graphical data of 2D graphics commands to the frame buffer 65.

Furthermore, when the graphics application 17 is operating in the immediate mode, the control logic 252 can be configured to cause the X server 162 to route the graphical data of 2D graphics commands to the DIX and DDX layers 175 and 179 as described above. Furthermore, instead of causing the X server 162 to route the 3D graphics commands to the slave pipelines 56–59 external to the master pipeline's computer 133, the control logic 262 can be configured to cause the X server 162 to route the 2D graphical data of 3D graphics commands to the DIX and DDX layers 175 and 179 and to route the 3D graphical data of the 3D graphics commands to the OGL daemon 180 of the master pipeline 55. As a result, both the 2D and 3D graphical data received from the graphics application 17 are rendered by the master pipeline 55 to the frame buffer 65.

In such an embodiment, the frame buffer 65 includes all of the pixel color values that are to be used for the pixels of the display device 83. Thus, the display device 83 can be configured to read data directly from the frame buffer 65, or the compositor 76 can be configured to simply pass the graphical data received from the frame buffer 65 to the display device 83, as the composite signal 77, without modifying the passed data.

Therefore, when the graphics application 17 is operating in the immediate mode, the graphics commands received from the graphics application 17 bypass the slave pipelines 56–59 external to the master pipeline's computer 133. This bypassing of the external slave pipelines 56–59 when the graphics application 17 is operating in immediate mode helps to increase the rendering speed of the system 50 since the master pipeline 55 is not burdened with the task of buffering copies of the 3D graphics commands received from the graphics application and of providing each of the external slave pipelines 56–59 with the buffered copies.

Note that if any of the slave pipelines 56–59 are implemented via the same computer 133 as the master pipeline 55, then the graphical data of the graphics commands received from the graphics application 17 may be provided to such slave pipelines 56–59 without significantly impairing the rendering speed of the system 50. In such an embodiment, graphical data is rendered to more than one frame buffer 65–69, and the compositor 76 preferably forms the composite data signal 77 based on the rendered data in the one or more frame buffers 65–59 according to techniques described above.

In another embodiment, the bypass control logic 252 may be included in and implemented via the client-side GLX layer 131 FIG. 3) rather than in the X server 162 (FIG. 4). In this regard, when the graphics application 17 is operating in the display list mode, the control logic 252 can be configured to cause the client-side GLX layer 131 to establish a connection with the X server 162 of the master pipeline 55. The client-side GLX layer 131 may then be configured to translate the graphics command received from the graphics application 17 and to pass the translated commands to the X server 162. The X server 162, in turn, routes the 3D graphics commands to the slave pipelines 56–59 and routes the 2D graphical data of the 2D graphics commands to the DIX and DDX layers 175 and 179, as described above.

As a result, the slave pipelines 56–59 render the graphical data from the 3D graphics commands to the frame buffers 56–59 according to techniques previously described herein, and the master pipeline 55 renders the graphical data from the 2D graphics commands to the frame buffer 65.

Furthermore, when the graphics application 17 is operating in the immediate mode, the control logic 252 can be configured to cause the client-side GLX layer 131 to establish a connection with the X server 162 and to pass the 2D graphical data over this connection to the X server 162. The X server 162 then routes the 2D graphical data to the DIX and DDX layers 175 and 179, which render this data to the frame buffer 65. However, instead of causing the GLX layer 131 to pass the 3D graphical data over the foregoing connection, the control logic 252 can be configured to cause the client-side GLX layer 131 to establish another connection directly with the OGL daemon 180 (FIG. 4) of the master pipeline 55 and to route the 3D graphical data to this OGL daemon 180. The OGL daemon 180 then renders the 3D graphical data to the frame buffer 65. As a result, both the 2D and 3D graphical data of the commands issued by the application 17 are rendered by the master pipeline 55 to the frame buffer 65.

In such an embodiment, the frame buffer 65 includes all of the pixel color values that are to be used for the pixels of the display device 83. Thus, the display device 83 can be configured to read data directly from the frame buffer 65, or the compositor 76 can be configured to simply pass the graphical data received from the frame buffer 65 to the display device 83 as the composite signal 77 without modifying the passed data.

Therefore, when the graphics application 17 is operating in the immediate mode in this embodiment, the graphical data of the commands issued by the graphics application 17 bypasses the slave pipelines 56–59 that are external to the computer 133 of the master pipeline 55. Note that if any of the slave pipelines 56–59 are implemented via the master pipeline's computer 133, then the control logic 252 can be configured to cause the client-side GLX layer 131 can be configured to establish a connection with either the X server 202 (FIG. 5) or the OGL daemon 205 (FIG. 5) of the slave pipeline 56–59 and respectively provide the X server 202 or OGL daemon 205 with 2D or 3D graphical data. In such an embodiment, graphical data is rendered to more than one frame buffer 65–69, and the compositor 76 preferably forms the composite data signal 77 based on the rendered data in the one or more frame buffers 65–69 according to techniques described above.

Figure 6:
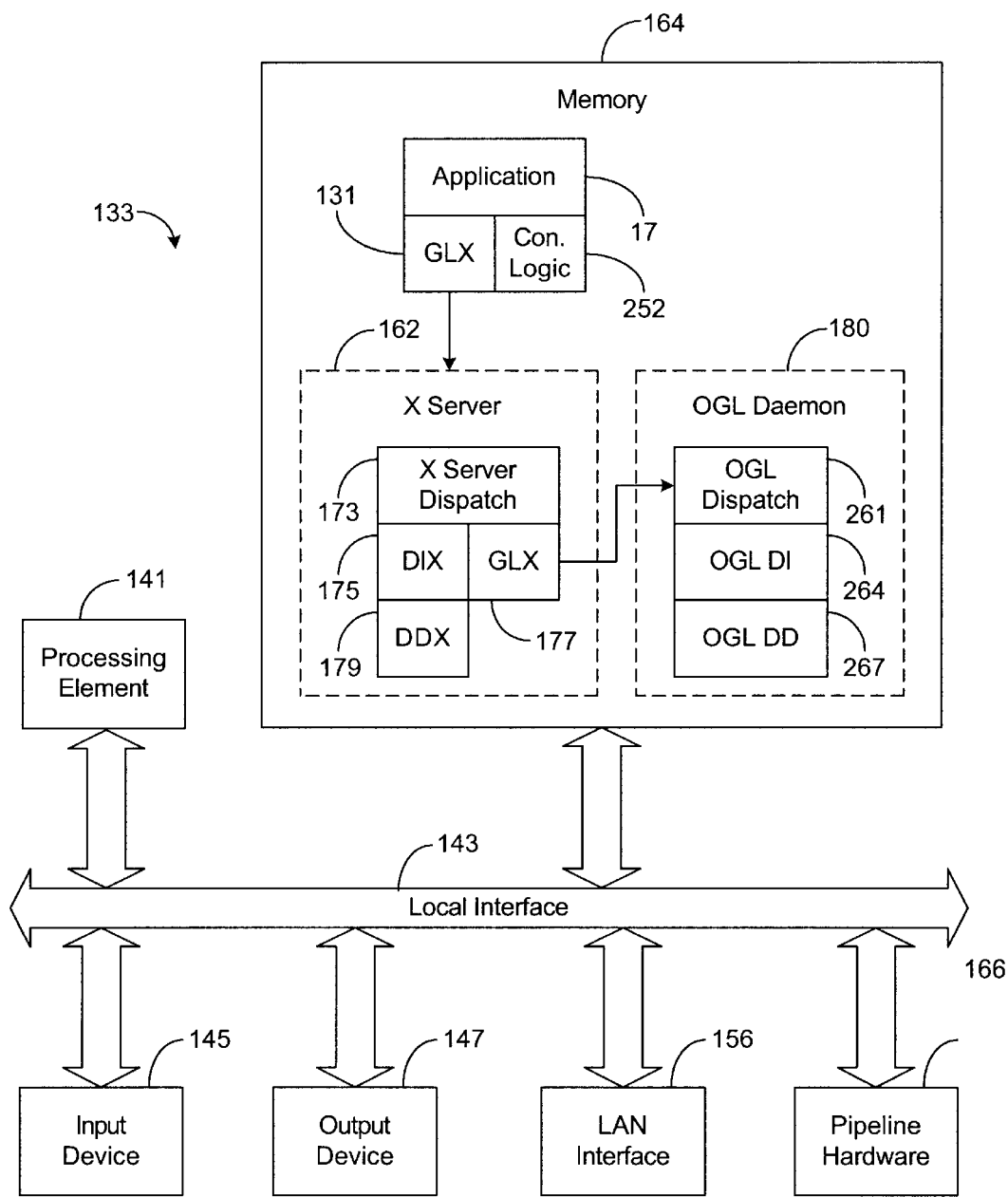
FIG. 6 is a block diagram illustrating another embodiment of the computer depicted by FIG. 4.

Furthermore, in embodiments where the graphics application 17 is located on the same computer as the control logic 252, the control logic 252 can be configured to bypass the slave pipelines 56–59 by rendering the graphical data of the application's graphics commands to the frame buffer 65 without utilizing the X server 162 of the master pipeline 55. In this embodiment, the graphics application 17 and the control logic 252 preferably reside on the same computer, such as the computer 133, as shown by FIG. 6. If the graphics application 17 is operating in the display list mode, the control logic 252 preferably allows the commands from application 17 to be processed by the X server 162 according to the techniques described above. Thus, in such a situation, the X server 162 of the master pipeline 55 preferably renders the graphical data from 2D graphics commands to the frame buffer 65 and passes the 3D graphics commands to slave pipelines 56–59, which render the graphical data from these commands to the frame buffers 66–69.

However, when the graphics application 17 is operating in the immediate mode, the control logic 252 may be configured to render, to the frame buffer 65, the graphical data of each of the graphics commands issued by the application 17. In this regard, the control logic 252 may drive such graphical data through the pipeline hardware 166 to the frame buffer 65 utilizing various known rendering techniques and/or protocols, such as known techniques for enabling direct hardware access (DHA). As a result, when the graphics application 17 is operating in the immediate mode, the slave pipelines 56–59 are bypassed, and the master pipeline 55, under the direction and control of the control logic 252, renders all of the graphical data received from the application 17 to the frame buffer 65.

As illustrated by the aforedescribed embodiments, the effect of bypassing the external slave pipelines 56–59 can be achieved whether the bypass control logic 252 is implemented via the X server 162, is implemented via the client-side GLX layer 131, or is implemented separate from the X server 162 and the client-side GLX layer 131. However, utilizing either of the two latter embodiments (i.e., implementing the control logic 252 via the client-side GLX layer 131 or implementing the control logic 252 separate from the X server 162 and the client-side GLX layer 131) has the added advantage that conventional X servers can be utilized to implement the X server 162 of FIGS. 4 and 6 without having to modify the conventional X servers, which are typically "off the shelf" components.

It should also be noted that aforedescribed embodiments for controlling the bypassing of the slave pipelines 56–59 have been presented herein for illustrative purposes, and there are various other methodologies that may be employed for controlling the bypassing of the slave pipelines 56–59 that are external to the master pipeline's computer 133 of the master pipeline 55.

In addition, it is possible to automatically detect, based on the protocol used by the graphics application 17, whether the graphics application 17 is operating in the immediate mode and, therefore, whether or not the slave pipelines 56–59 external to the master pipeline's computer 133 should be bypassed. Therefore, the bypass control logic 252 can be configured to automatically detect whether the graphics application 17 is operating in the immediate mode and then automatically bypass the external slave pipelines 56–59 when it is detected that the graphics application 17 is operating in the immediate mode.

In an alternative embodiment, a user may submit an input via input devices 115 (FIG. 3) or 145 (FIG. 4), for example, indicating whether or not the slave pipelines 56–59 external to the master pipeline's computer 133 should be bypassed. As an example, when the graphics application 17 is an immediate mode application, the user may submit an input indicating that the slave pipelines 56–59 external to the master pipeline's computer 133 should be bypassed. The bypass control logic 252 can be configured to then to control whether or not the external slave pipelines 56–59 are bypassed according to the input received from the user. Note that various other techniques for determining whether or not the external slave pipelines 56–59 should be bypassed can be employed in other embodiments.

OPERATION

The use and operation of an exemplary embodiment of the graphical display system 50 and associated methodology are described hereafter. For purposes of illustration, assume that each of the pipelines 55–59 is implemented on a different computer. Therefore, each of the slave pipelines 56–59 is external to the computer 133 utilized to implement the master pipeline 55.

Figure 7:
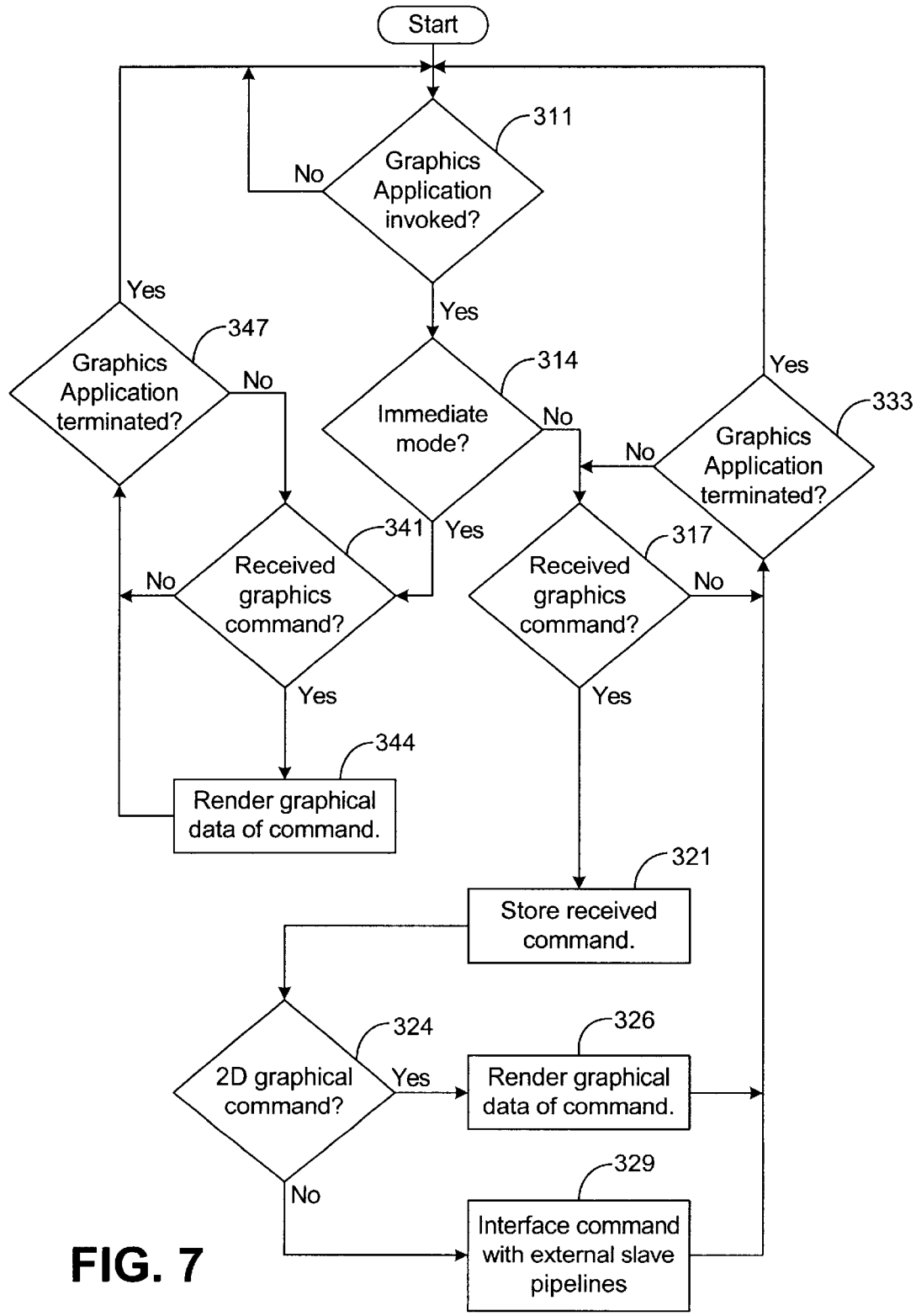
FIG. 7 is a flow chart illustrating an exemplary architecture and functionality of the master pipeline, including bypass control logic, such as is depicted in FIG. 2

Upon invocation of the graphics application 17, the bypass control logic 252 determines whether or not the graphics application 17 is designed to operate in the immediate mode, as shown by blocks 311 and 314 of FIG. 7. If the graphics application 17 does not operate in the immediate mode, then bypass control logic 252 does not cause bypassing of the external slave pipelines 56–59. Furthermore, the master pipeline 55 stores the graphical data of each graphics command issued by the graphics application 17, as shown by blocks 317 and 321. If the received command is a 2D graphics command, the master pipeline 55 renders the graphical data of the 2D graphics command to the frame buffer 65, as shown by blocks 324 and 326. If the received command is a 3D graphics command, the master pipeline 55 interfaces the 3D graphics command with the external slave pipelines 56–59, as shown by blocks 324 and 329. Each of the slave pipelines 56–59 then stores and renders the graphical data of the 3D graphics command. Therefore, the compositor 76 may utilize the data in the various frame buffers 65–69 in forming the composite signal 77 provided to the display device 83. The master pipeline 55 continues to process the received graphics commands according to the foregoing techniques until termination of the graphics application 17 is detected in block 333.

Moreover, if the graphics application 17 does operate in the immediate mode, then bypass control logic 252 causes bypassing of the external slave pipelines 56–59. Therefore, for each graphics command issued by the graphics application 17, the master pipeline 55 renders the graphical data of the command to the frame buffer 65, as shown by blocks 341 and 344. Furthermore, the compositor 76 refrains from utilizing frame buffers 66–69 associated with external slave pipelines 56–59 in forming the composite signal 77 provided to the display device 83. Rendering, by the master pipeline 55, of the graphical data received from the application 17 continues until termination of the graphics application 17 is detected in block 347.

By implementing the foregoing techniques, the master pipeline 55 is not burdened with the task of providing the external slave pipelines 56–59 with copies of the graphics commands issued by the application 17 when the application 17 is operating in the immediate mode, thereby helping to optimize the performance of the system 50.

It should be noted that if one or more of the slave pipelines 56–59 is implemented via the computer 133 of the master pipeline 55 in other embodiments, then it may be desirable to utilize the foregoing one or more slave pipelines 56–59 to render the graphical data of one or more of the graphics commands in block 344. In this regard, providing the foregoing one or more slave pipelines 56–59 with the graphical data of one or more of the received graphics commands is not likely to introduce a significant delay to the rendering speed of the system 50 since such pipelines 56–59 can efficiently share the same computer resources utilized by the master pipeline 55.

Now, therefore, the following is claimed:

1. A system for rendering graphical data from a graphics application, comprising:
   a plurality of frame buffers;
   a plurality of graphics pipelines, each of the graphics pipelines configured to render graphical data to a different one of the frame buffers;
   a display device;
   a compositor configured to form a composite data signal based on graphical data from the plurality of frame buffers and to provide the composite data signal to the display device; and
   bypass control logic configured to selectively cause the graphical data from the graphics application to bypass at least one of the pipelines.

2. The system of claim 1, wherein the logic is configured to make a determination as to whether the graphics application is operating in an immediate mode, and wherein the bypass control logic is configured to selectively cause the graphical data from the graphics application to bypass the at least one pipeline based on the determination.

3. The system of claim 1, further comprising an input device configured to receive a user input, wherein the bypass control logic selectively causes the graphical data from the graphics application to bypass the at least one pipeline based on the user input.

4. The system of claim 1, wherein each of the graphics pipelines comprises an X server for rendering graphical data.

5. The system of claim 1, wherein the one pipeline is implemented via a first computer, and wherein another of the pipelines is implemented via a second computer.

6. The system of clam 5, wherein the bypass control logic is configured to cause all of the graphical data received from the graphics application to be rendered by the second computer when the bypass control logic causes the graphical data from the graphics application to bypass the at least one pipeline.

7. The system of claim 5, wherein the first and second computers are interconnected via a communication network.

8. A system for rendering graphical data from a graphics application, comprising:

a plurality of frame buffers;

a plurality of graphics pipelines, each of the graphics pipelines configured to render graphical data to a different one of the frame buffers; and logic configured to determine a mode of operation of the graphics application and to prevent, based on the mode of operation of the graphics application, at least one of the graphics pipelines from rendering the graphical data from the graphics application.

9. The system of claim 8, wherein the logic is further configured to determine a mode of operation of another graphics application and to allow, based on the mode of operation of the other graphics application, each of the plurality of graphics pipelines to render graphical data from the other graphics application.

10. The system of claim 8, further comprising a compositor configured to form a composite data signal based on graphical data from the plurality of frame buffers and to provide the composite data signal to a display device.

11. The system of claim 8, wherein the logic, in response to a determination by the logic that the graphics application is operating in an immediate mode, prevents the at least one graphics pipeline from rendering the graphical data from the graphics application.

12. A method, comprising the steps of:

receiving graphical data from a graphics application;

rendering, via a first graphics pipeline, at least a portion of the received graphical data to one of a plurality of frame buffers;

identifying a mode of operation of the graphics application;

determining whether to enable a second graphics pipeline to render at least a portion of the received graphical data based on the identified mode of operation of the graphics application; and preventing the second graphics pipeline from rendering the graphical data from the graphics application based on the determining step.

13. The method of claim 12, further comprising:

receiving graphical data from another graphics application;

identifying a mode of operation of the other graphics application; and enabling the second graphics pipeline to render at least a portion of the graphical data from the other graphics application based on the identified mode of operation of the other graphics application.

14. The method of claim 12, wherein the preventing step is performed in response to a determination that the graphics application is operating in an immediate mode.

15. The method of claim 12, further comprising:

forming a composite data signal based on graphical data from each of the plurality of the frame buffers; and displaying an image based on the composite data signal.

16. The method of claim 12, further comprising:

utilizing a first computer to implement the first graphics pipeline;

utilizing a second computer to implement the second graphics pipeline; and causing all of the graphical data received from the graphics application in the receiving step to be rendered via the first computer based on the identified mode of operation.

17. A method for rendering graphical data from graphics applications, comprising the steps of:

receiving a graphics command from a graphics application;

rendering, via a first graphics pipeline, graphical data from the graphics command to one of a plurality of frame buffers;

identifying a mode of operation of the graphics application; and causing the graphics command to bypass a second graphics pipeline based on the identifying step.

18. The method of claim 17, further comprising:

receiving another graphics command from another graphics application;

identifying a mode of operation of the other graphics application; and rendering, via the first and second graphics pipelines, graphical data from the other graphics command based on the identified mode of operation of the other graphics application.

19. The method of claim 17, further comprising:

forming a composite data signal based on graphical data from each of the plurality of frame buffers; and displaying an image based on the composite data signal.

20. The method of claim 17, wherein the causing step is performed in response to a determination that the graphics application is operating in an immediate mode.

* * * * *